(12) United States Patent
DeRyke et al.

(10) Patent No.: US 6,939,486 B2
(45) Date of Patent: Sep. 6, 2005

(54) APPARATUS AND METHOD FOR MAKING INTRAOCULAR LENSES

(75) Inventors: Kevin J. DeRyke, Tampa, FL (US); Michael H. Dobner, Honeoye Falls, NY (US); Larry C. Hovey, Ontario, NY (US); Michael J. Moorehead, Fairport, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 350 days.

(21) Appl. No.: 10/180,797

(22) Filed: Jun. 25, 2002

(65) Prior Publication Data

US 2003/0234456 A1 Dec. 25, 2003

(51) Int. Cl.[7] .............................................. B29D 11/00
(52) U.S. Cl. ..................... 264/1.7; 264/2.5; 425/546; 425/808; 425/812
(58) Field of Search ................... 264/1.1, 1.7, 2.5; 425/808, 546, 812; 623/6

(56) References Cited

U.S. PATENT DOCUMENTS

| | | | |
|---|---|---|---|
| 4,284,591 A | 8/1981 | Neefe | 264/1.1 |
| 4,786,444 A | 11/1988 | Hwang | 264/1.4 |
| 4,789,324 A | 12/1988 | Akhavi | 425/352 |
| 4,815,690 A | 3/1989 | Shepherd | 249/82 |
| 4,834,750 A | 5/1989 | Gupta | 623/6 |
| 4,847,020 A | 7/1989 | Akhavi | 264/2.2 |
| 4,971,732 A | 11/1990 | Wichterle | 264/1.1 |
| 4,993,936 A | 2/1991 | Siepser | 425/408 |
| 5,071,101 A | 12/1991 | Wood | 249/139 |
| 5,104,590 A | 4/1992 | Blake | 264/2.5 |
| 5,141,677 A | 8/1992 | Fogarty | 264/1.4 |
| 5,169,569 A | 12/1992 | Ingram | 264/2.7 |
| 5,322,649 A | 6/1994 | Rheinish | 264/2.7 |
| 5,507,806 A | 4/1996 | Blake | 623/6 |
| 5,545,366 A | 8/1996 | Lust | 264/225 |
| 5,611,968 A | 3/1997 | Grisoni | 264/2.1 |
| 5,620,720 A | 4/1997 | Glick | 425/408 |
| 5,645,665 A | 7/1997 | Salazar | 156/73.1 |
| 5,656,210 A | 8/1997 | Hill | 264/2.6 |
| 5,674,283 A | 10/1997 | Stoy | 623/5 |
| 5,674,435 A | 10/1997 | Blake | 264/2.7 |
| 5,762,836 A | 6/1998 | Bos | 264/1.7 |
| 5,837,156 A | 11/1998 | Cumming | 249/119 |
| 5,861,031 A | 1/1999 | Namdaran | 623/6 |
| 6,015,511 A | 1/2000 | Yasuda | 264/1.7 |
| 6,039,899 A | 3/2000 | Martin | 264/1.36 |
| 6,258,299 B1 | 7/2001 | Yamashita | 264/1.1 |
| 6,276,920 B1 | 8/2001 | Doke | 425/412 |
| 6,305,661 B1 | 10/2001 | Kennedy | 249/117 |
| 6,391,230 B1 | 5/2002 | Sarbadhikari | 264/1.38 |

FOREIGN PATENT DOCUMENTS

WO          00/59713          10/2000          ........... B29D/11/00

*Primary Examiner*—Mathieu D. Vargot

(57) ABSTRACT

Method and apparatus for molding an IOL comprising first and second mold halves each having an optic forming surface and haptic forming surfaces which together define a mold cavity in the shape of the IOL to be molded therein when the mold halves are assembled together. An injection port is formed and connects to one of said haptic forming surfaces or the optic forming surface wherethrough a polymerizable material is injected into the mold cavity. A venting port is formed and connects to another haptic wherethrough air escapes from the mold cavity as the polymerizable material is injected through the injection port.

20 Claims, 7 Drawing Sheets

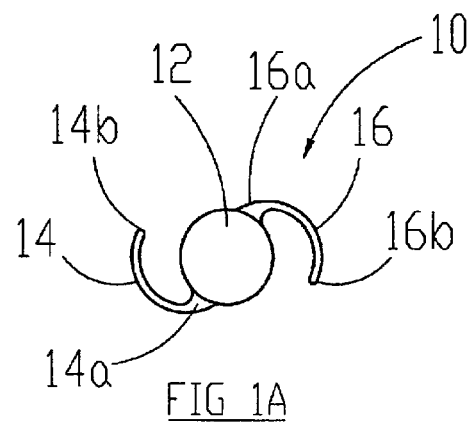
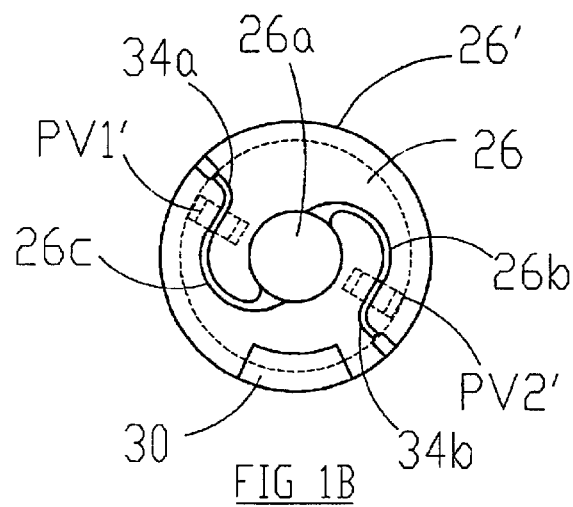
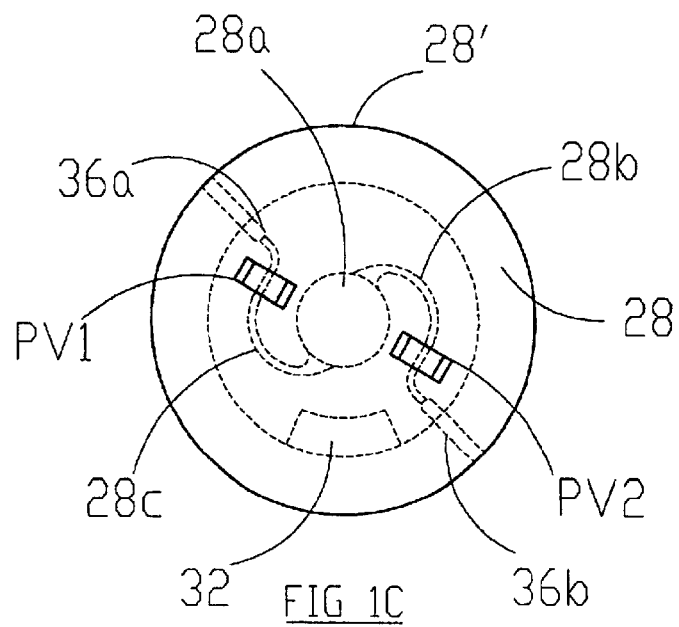

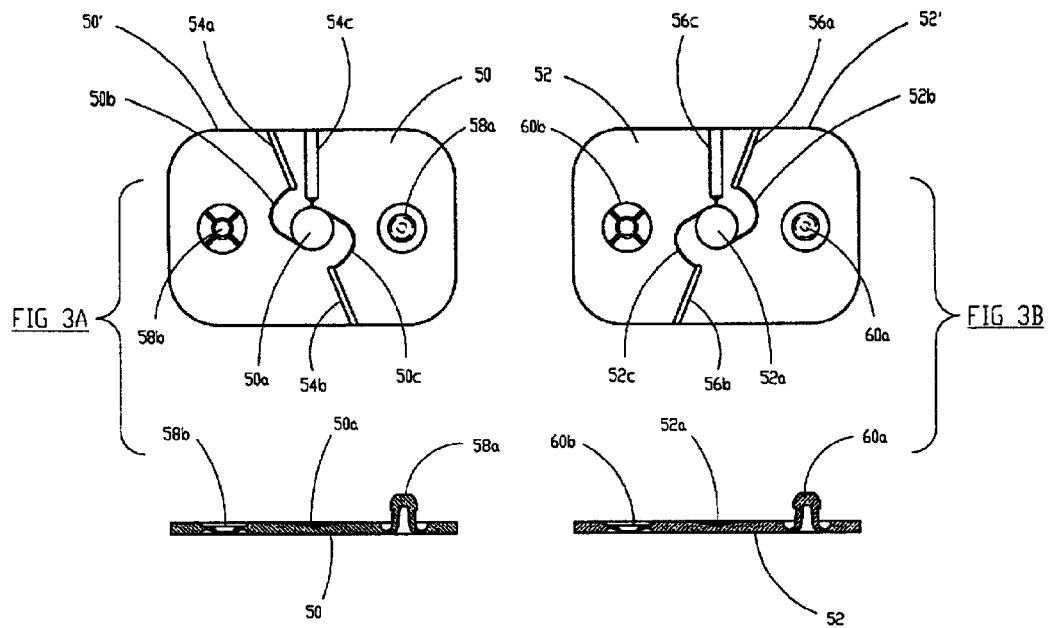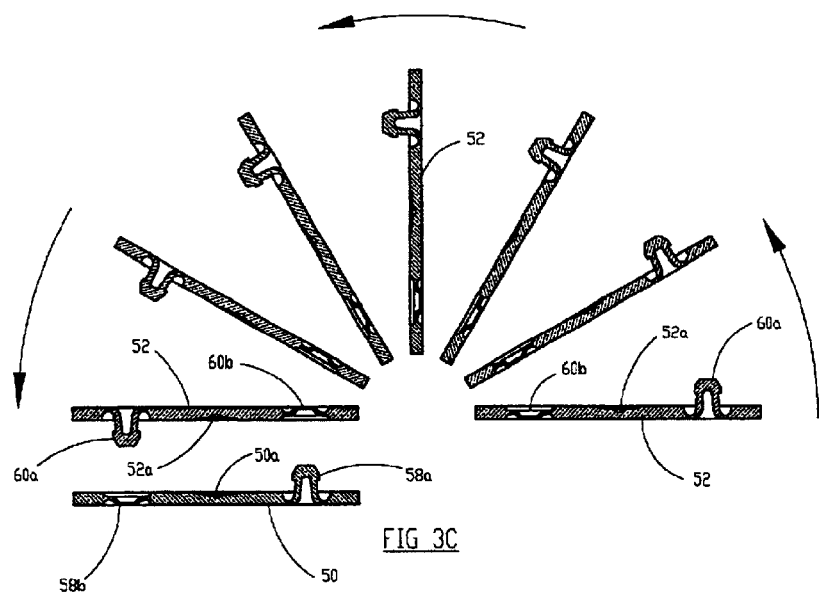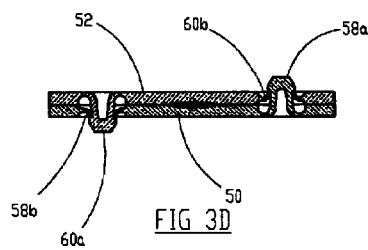

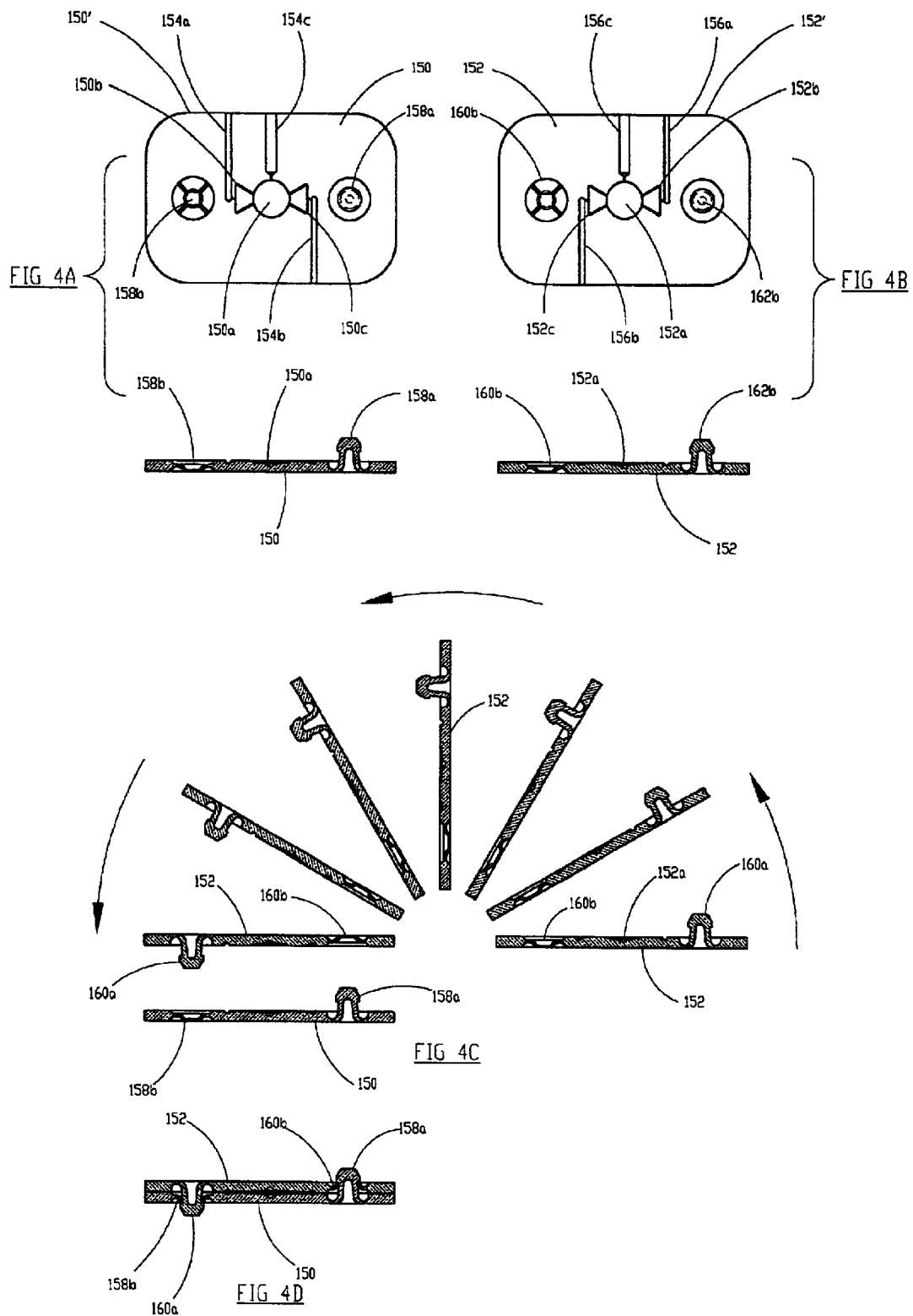

APPARATUS AND METHOD FOR MAKING INTRAOCULAR LENSES

BACKGROUND OF THE INVENTION

The present invention relates to the manufacture of intraocular lenses (IOLs) for implantation in an eye. The present invention more particularly relates to an apparatus and method for molding IOLs.

A common and desirable method of treating a cataract eye is to remove the clouded, natural lens and replace it with an artificial IOL in a surgical procedure known as cataract extraction. In the extracapsular extraction method, the natural lens is removed from the capsular bag while leaving the posterior part of the capsular bag (and preferably at least part of the anterior part of the capsular bag) in place within the eye. In this instance, the capsular bag remains anchored to the eye's ciliary body through the zonular fibers. In an alternate procedure known as intracapsular extraction, both the lens and capsular bag are removed in their entirety by severing the zonular fibers and replaced with an IOL which must be anchored within the eye absent the capsular bag. The intracapsular extraction method is considered less attractive as compared to the extracapsular extraction method since in the extracapsular method, the capsular bag remains attached to the eye's ciliary body and thus provides a natural centering and locating means for the IOL within the eye. The capsular bag also continues its function of providing a natural barrier between the aqueous humor at the front of the eye and the vitreous humor at the rear of the eye.

Although there are many different IOL designs, all IOLs have an optic for directing and focusing light on the retina, along with means for anchoring the IOL in the correct position within the eye. In one common IOL design, the anchoring means comprises two resilient filaments called haptics which extend in a curved fashion from opposite sides of the optic. In the so-called "one-piece" IOL design, the haptics are integrally formed with the optic, for example by milling the optic and haptics from a single blank of IOL material. In the so-called "three-piece" design, the haptics are mechanically attached to the optic, typically by inserting an end of the haptic into a respective anchoring hole in the optic. In this design, adhesives are sometimes also used to ensure the haptics are securely attached to the optic.

Three-piece IOL designs are typically more difficult to manufacture due to the added steps required to mechanically anchor the haptics to the optic, and also because adhesives can be difficult to apply and have adverse physiological affects should the adhesive come into contact with the delicate tissues of the eye. There is also the possibility that the mechanical anchoring means may inadvertently cause glare or create other interference with the normal passing of light into the eye through the IOL.

IOLs may be manufactured by molding, milling, lathing, or a combination thereof. Of these manufacturing methods, molding is generally the least expensive method of manufacture and hence more desirable than lathing and/or milling. Prior art molding methods include compression molding, injection molding, and transfer molding, for example. Many of these prior art methods are directed at three-piece IOL designs which suffer from the drawbacks mentioned above. Prior art molding methods of one-piece IOLs also have drawbacks such as the requirement for a number of auxiliary processing steps, as well as difficulty to implement in a high-speed, robust manufacturing process. It would therefore be highly desirable to have an apparatus and method for molding a single-piece IOL design in an inexpensive manner which is adaptable to a high speed production facility.

SUMMARY OF THE INVENTION

The present invention address the need for an inexpensive yet robust apparatus and method for molding single-piece IOLs by providing a mold having two mating halves each having an optic forming surface and one or more haptic forming surfaces. Means for properly aligning the mold halves are included so that as the mold halves are brought together, the optic forming surfaces and haptic forming surfaces on each mold half are in correct alignment so that they together form a mold cavity in the shape of the IOL to be formed therein. In a first embodiment, the mold halves are formed in a generally cylindrical configuration which may be press-fit together to form the mold cavity. In another embodiment, the mold halves are formed in a generally plate-like configuration which are snap-fit together to form the mold cavity.

A first embodiment of the invention described herein is for molding an IOL having two open-looped haptics. In this first embodiment, the free end of one haptic is connected to the injection port for delivery of the IOL material into the mold cavity while the free end of the opposite haptic is connected to a venting port to vent air from the mold cavity as the IOL material is injected into the injection port of the opposite haptic. A pinch valve may be provided adjacent the free end of each haptic so that the injection port and venting port may be closed off from its respective haptic after injection of the IOL material into the mold cavity. Once the mold cavity has been filled, the liquid lens material is cured (e.g., using UV and/or thermal means) to form the IOL. Once curing is complete, the mold halves are opened and the IOL is released from the mold.

A second embodiment of the invention described herein is for molding an IOL having two closed-looped haptics. In this second embodiment, the injection port is positioned to extend from one of the closed-looped haptics while the venting port is positioned to extend from the opposite closed-looped haptic.

In an advantageous embodiment of the invention, the molds are placed in a vacuum during mold filling and curing to reduce the occurance of pits and bubbles in the finished IOL.

BRIEF DESCRIPTION OF THE DRAWINGS

FIG. 1A is a plan view of an open-looped IOL;

FIG. 1B is a plan view of an anterior IOL mold half of a first embodiment of the present invention;

FIG. 1C is a plan view of a posterior IOL mold half of a first embodiment of the present invention;

FIG. 3A are plan and side elevational views of one mold half of a third embodiment of the present invention;

FIG. 3B are plan and side elevational views of the second mold half of the third embodiment of the present invention;

FIG. 3C is a side elevational view showing the sequential movement for assembling the mold halves of the third embodiment of the invention;

FIG. 3D is a side elevational view showing the mold halves of FIG. 3C in the fully assembled condition;

FIG. 4A are plan and side elevational views of one mold half of a fourth embodiment of the present invention;

FIG. 4B are plan and side elevational views of the second mold half of the fourth embodiment of the present invention;

FIG. 4C is a side elevational view showing the sequential movement for assembling the mold halves of the fourth embodiment of the invention;

FIG. 4D is a side elevational view showing the mold halves of FIG. 4C in the fully assembled condition;

DETAILED DESCRIPTION

Figure 1D:
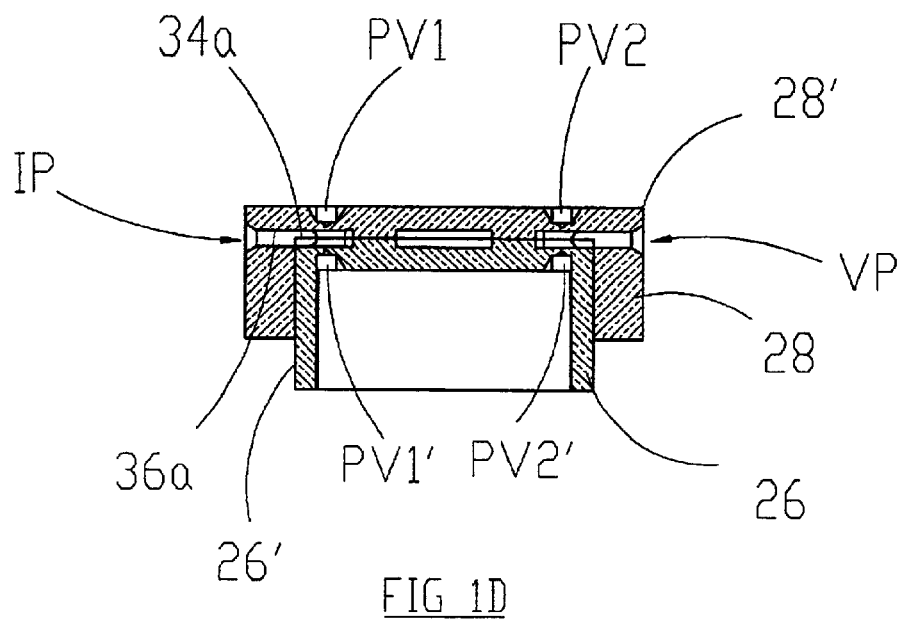
FIG. 1D is a cross-sectional, side-elevation view of the anterior and posterior mold halves of FIGS. 1B and 1C assembled together.

Referring now to the drawing, there is seen in FIG. 1A a prior art open-looped IOL 10 having an optic 12 and first and second haptics 14,16 attached at first ends 14a, 16a thereof to generally opposite sides of optic 10, respectively. The opposite, free ends 14b, 16b of the haptics are spaced from optic 12 and curve in a looped fashion which is why they are referred to as "open-looped" haptics.

Figure 2A:
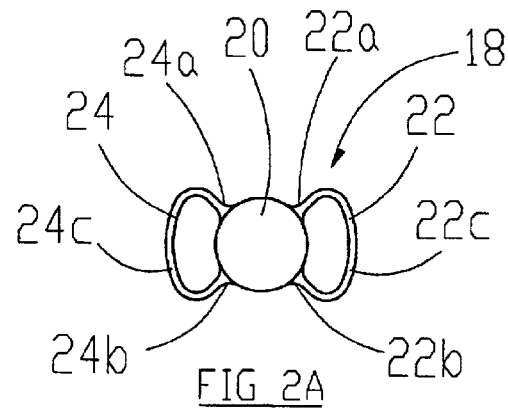
FIG. 2A is a plan view of a closed-looped IOL.

FIG. 2A shows a prior art closed-looped IOL 18 having an optic 20 and first and second haptics 22,24 each having first and second ends 22a,b and 24a,b attached to optic 20 and having a looped portion 22c,24c extending therebetween, respectively. Since the haptics are attached at either end to the optic and therefore do not have any free end, they are referred to closed-looped haptics.

FIGS. 1B–1E show a first embodiment of the present invention for molding an open-looped IOL such as IOL 10 of FIG. 1A. In this first embodiment, a mold is provided having first and second, generally cylindrical mold halves 26,28 which may be brought together to define a mold cavity in the shape of IOL 10. First mold half 26 includes an optic forming surface 26a and first and second haptic forming surfaces 26b,26c, respectively, extending from optic forming surface 26a. Likewise, second mold half 28 includes an optic forming surface 28a and first and second haptic forming surfaces 28b,28c, respectively. When the mold halves are brought together, the optic forming surfaces 26a,28a align with one another and the haptic forming surfaces 26b,c and 28b,c also align with one another, respectively, to form the mold cavity which describes the shape of the IOL 10 molded therein. To ensure proper alignment between the mold halves, alignment means are provided, for example in the form of mating projection and recess 30 and 32 located on the facing surfaces of mold halves 26,28, respectively, radially outwardly of the mold cavity adjacent the respective peripheral walls 26',28' thereof.

Figure 1E:
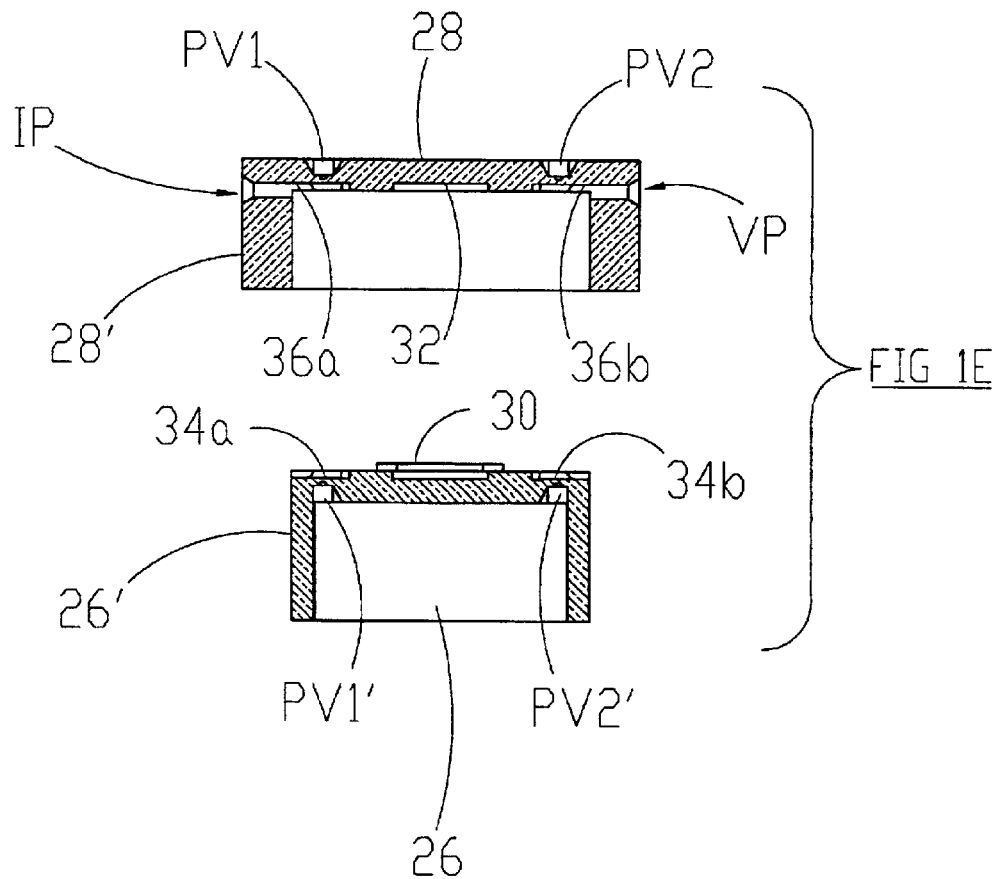
FIG. 1E is the view of FIG. 1D showing the mold halves in spaced relation.

An injection port "IP" is defined in the assembled mold by facing injection port surfaces 34a and 36a which are provided on each mold half 26,28, respectively, extending from a respective haptic forming surface 26c and 28c to the peripheral wall 26',28' of the assembled mold for access by an injection nozzle (not shown). The injection port "IP" is configured the same for the first and second embodiments of the invention and is shown in the views of FIGS. 1D and 1E. A venting port "VP" is defined in the assembled mold by facing venting surfaces 34b, 36b which are provided on each mold half 26,28, respectively, extending from a respective haptic forming surface 26b,28b, to the peripheral wall 26',28' of the assembled mold for evacuation of air from the mold cavity as it is being filled with liquid mold material through the injection port "IP". Once the mold cavity is completely filled, a pair of pinch valves PV1 and PV2 on mold half 28 and a pair of aligned pinch valves PV1' and PV2' on mold half 26 are actuated to close the mold cavity off from the injection port IP and venting port VP, respectively. It is noted that the closing of the pinch valves defines the haptic free ends 14b, 16b of the molded IOL 10.

Once the mold material has cured (e.g., by thermal and/or UV means), the mold halves are separated and the molded IOL is removed therefrom for further processing as required (e.g., polishing, sterilization, packaging, etc.). It may thus be realized that a single-piece open-looped IOL 10 may be easily molded with the haptics integrally formed with the optic using the inventive molding apparatus and method.

The mold material used to form the IOL may be any polymerizable material useful in making IOLs, examples of which are hydrogels, silicones, polymethylmethacrylate, etc. Also, more than one type of material may be used to form different parts of the IOL. For example, a PMMA may be used to fill and form the haptics while a hydrogel is used to fill and form the optic. This may be accomplished in the present invention by using a sequential filling process whereby the first injection of PMMA fills the haptic cavity attached to the venting port VP, the second injection of hydrogel fills the optic cavity, and the last injection of PMMA fills the haptic cavity connected to the injection port IP. During curing of the assembled mold, the different mold materials polymerize together to form a single-piece IOL. Another method for making such an IOL made of different materials would be to place already formed haptics (e.g., made of PMMA) into the respective haptic cavity and inject the optic material (e.g., a hydrogel) into the optic cavity through the alternate injection port AIP. In this instance, both the injection port IP and the venting port VP would act as venting ports.

Figure 2B:
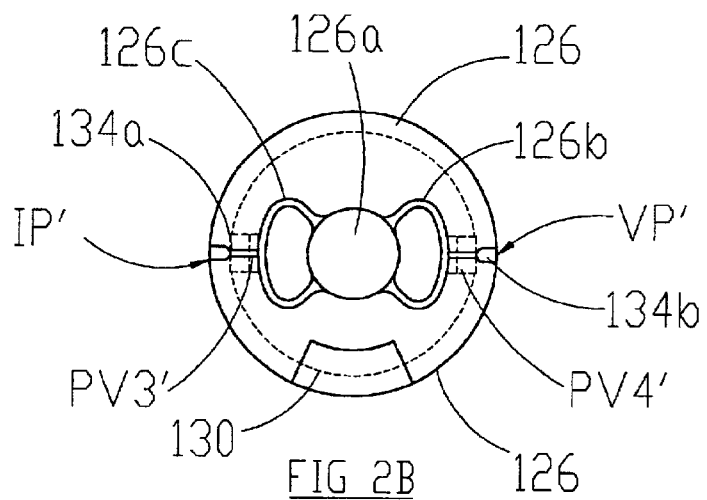
FIG. 2B is a plan view of an anterior IOL mold half of a second embodiment of the present invention.
Figure 2C:
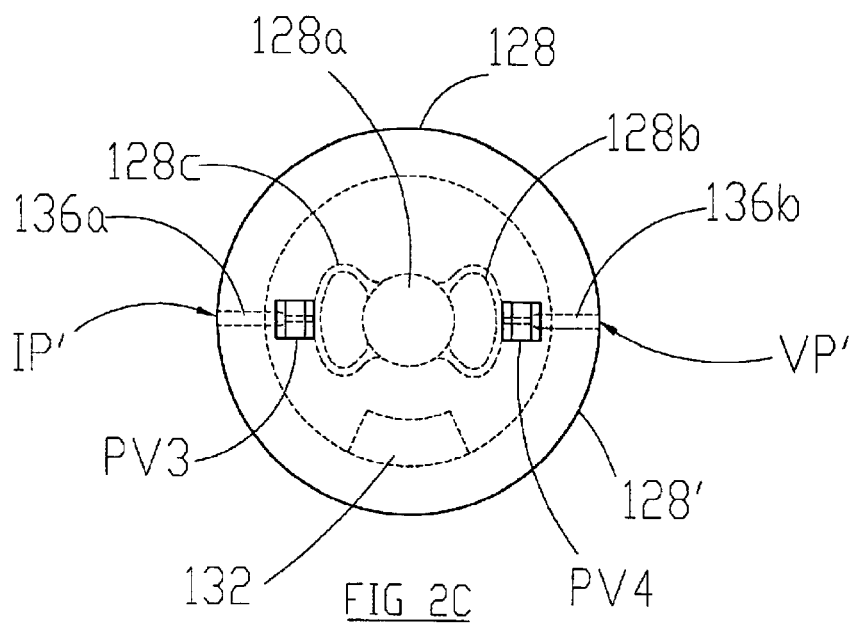
FIG. 2C is a plan view of a posterior IOL mold half of a second embodiment of the present invention.

Referring now to FIGS. 2A–2C, a second embodiment of the present invention is seen for molding a closed-looped IOL such as IOL 18 of FIG. 2A. In this second embodiment, a mold is provided having first and second mold halves 126,128 which may be assembled together to define a mold cavity in the shape of IOL 18. First mold half 126 includes an optic forming surface 126a and first and second haptic forming surfaces 126b, 126c, respectively, extending from optic forming surface 126a. Likewise, second mold half 128 includes an optic forming surface 128a and first and second haptic forming surfaces 128b, 128c, respectively. When the mold halves are brought together, the optic forming surfaces 126a, 128a align with one another and the haptic forming surfaces 126b,c and 128b,c also align with one another, respectively, to form the mold cavity which describes the shape of the IOL 18 molded therein. To ensure proper alignment between the mold halves, alignment means are provided, for example in the form of mating knob and recess 130,132 located radially outwardly of the mold cavity adjacent peripheral walls 126', 128', respectively.

An injection port IP' is defined in the assembled mold by injection port surfaces 134a, 134b and 136a, 136b which are provided on each mold half 126, 128, respectively, extending from haptic forming surfaces 126b, 128b and 126c,128c to the peripheral walls 126', 128' of the assembled mold for access by the injection nozzle (not shown). As stated above, the configuration of the injection ports IP' on the embodiment of FIGS. 2B and 2C is the same as injection port IP shown in FIGS. 1D and 1E. A venting port VP' is defined by venting port surfaces 134b, 136b provided on each mold half 126, 128, respectively, extending from the haptic forming surfaces 126b, 128b to the peripheral walls 126', 128' of the assembled mold for evacuation of air from the mold cavity as it is being filled through the injection port IP'.

Once the mold cavity is completely filled, a pair of pinch valves PV3 and PV4 on mold half 128 and a pair of aligned pinch valves PV3' and PV4' on mold half 126 are actuated to close the mold cavity off from the injection port IP' and venting port VP', respectively. Once the mold material has cured (e.g., by thermal and/or UV means), the mold halves are separated and the molded IOL is removed therefrom for further processing as required (e.g., polishing, sterilization, packaging, etc.). It may thus be realized that a single-piece closed-looped IOL 18 may be easily molded with the haptics integrally formed with the optic using the inventive molding apparatus and method.

Attention is now turned to FIGS. 3A–3D which show a third embodiment of the present invention comprising a mold having first and second mold halves 50, 52, respectively, which are of generally rectangular, plate-like configuration. Mold halves 50, 52 may be assembled together as seen in FIG. 3D to define a mold cavity in the shape of open-loop IOL 10. Thus, first mold half 50 includes an optic forming surface 50a and first and second haptic forming surfaces 50b,50c, respectively, extending from optic forming surface 50a. Likewise, second mold half 52 includes an optic forming surface 52a and first and second haptic forming surfaces 52b, 52c, respectively. When the mold halves are brought together, the optic forming surfaces 50a,52a align with one another and the haptic forming surfaces 50b,c and 52b,c also align with one another to form the mold cavity which describes the shape of the open-loop IOL 10 molded therein. To ensure proper alignment between the mold halves, alignment means are provided, for example in the form of mating bosses and finned apertures 58a, 60b and 60a, 58b which may be snap-fit together, respectively, in the manner seen in FIGS. 3C and 3D.

Referring still to FIGS. 3A and 3B, and also 5D, an injection port IP" is defined in the assembled mold (FIG. 5D) by injection port surfaces 54a, 56a which are provided on each mold half 50, 52, respectively, extending from haptic forming surfaces 50b, 52b to the peripheral walls 50', 52' of the assembled mold for access by the injection nozzle (not shown). A venting port VP" is defined by venting port surfaces 54b, 56b provided on each mold half 50, 52, respectively, extending from the haptic forming surfaces 50c, 52c to the peripheral walls 50', 52' of the assembled mold for evacuation of air from the mold cavity as it is being filled through the injection port IP".

An alternative injection port AIP is defined in the assembled mold by alternative injection port surfaces 54c and 56c formed in mold halves 50 and 52, respectively, extending from optic forming surfaces 50a, 52a to the peripheral walls 50', 52', respectively. In this embodiment, the injection port IP" would serve as a second venting port for evacuation of air from the mold cavity as it is being filled through alternative injection port AIP.

FIGS. 4A–4D show a fourth embodiment of the present invention comprising a mold having first and second mold halves 150, 152, respectively, which are of generally rectangular, plate-like configuration. Mold halves 150, 152 may be assembled together as seen in FIG. 4D to define a mold cavity in the shape of closed-looped IOL 18. Thus, first mold half 150 includes an optic forming surface 150a and first and second haptic forming surfaces 150b,150c, respectively, extending from optic forming surface 150a. Likewise, second mold half 152 includes an optic forming surface 152a and first and second haptic forming surfaces 152b, 152c, respectively. When the mold halves are brought together, the optic forming surfaces 150a,152a align with one another and the haptic forming surfaces 150b,c and 152b,c also align with one another to form the mold cavity which describes the shape of the closed-looped IOL 18 molded therein. To ensure proper alignment between the mold halves, alignment means are provided, for example in the form of mating bosses and finned apertures 158a, 160b and 160a, 158b which may be snap-fit together, respectively, in the manner seen in FIGS. 4C and 4D.

Referring still to FIGS. 4A and 4B, and also 5D, an injection port IP" is defined in the assembled mold (FIG. 5D) by injection port surfaces 154a, 156a which are provided on each mold half 150, 152, respectively, extending from haptic forming surfaces 150b, 152b to the peripheral walls 150', 152' of the assembled mold for access by the injection nozzle (not shown). It is noted that the location of the injection ports IP" and AIP and the venting port VP" are the same in both the third and fourth embodiments of the invention and the same FIG. 5D is therefore being used to illustrate these ports. A venting port VP" is defined by venting port surfaces 154b, 156b provided on each mold half 150, 152, respectively, extending from the haptic forming surfaces 150c, 152c to the peripheral walls 150', 152' of the assembled mold for evacuation of air from the mold cavity as it is being filled through the injection port IP".

An alternative injection port AIP is defined in the assembled mold by alternative injection port surfaces 154c and 156c formed in mold halves 150 and 152, respectively, extending from optic forming surfaces 150a, 152a to the peripheral walls 150', 152', respectively. In this embodiment, the injection port IP" would serve as a second venting port for evacuation of air from the mold cavity as it is being filled through alternative injection port AIP.

It is noted that in the embodiments of FIGS. 3–4, the mold halves may be made with the venting port VP and injection ports IP on the same side of the mold half such that the mold half is symmetrical. As such, only one tool would be required to make both mold halves since they would be identical in this instance.

Figure 5A:
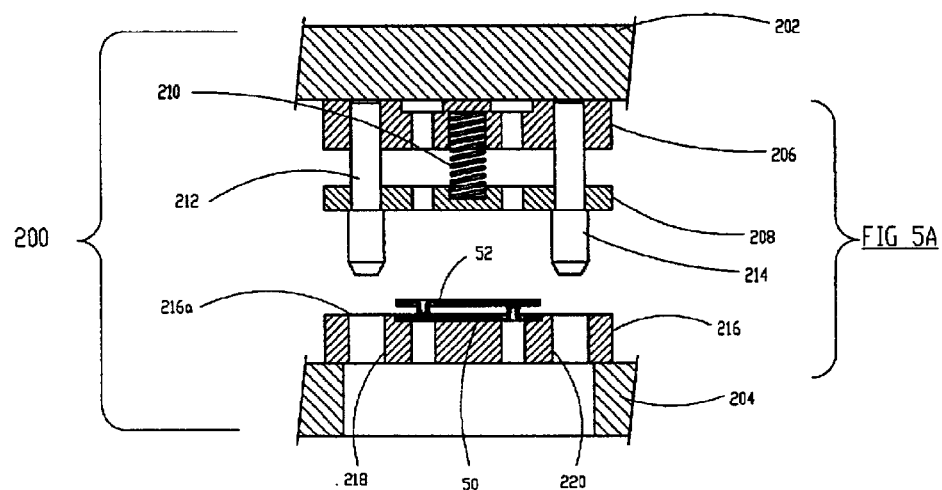
FIG. 5A is a cross-sectional, side elevational view of the tooling used to assemble the mold halves of the third and fourth embodiments of the invention with the top tool base shown in the raised position.
Figure 5B:
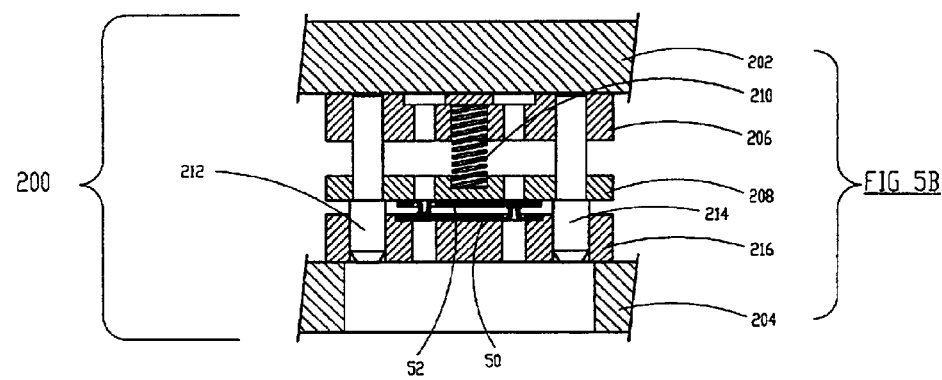
FIG. 5B is the view of FIG. 5A showing the top tool base in the lowered position immediately prior to full engagement with the lower tool base.
Figure 5C:
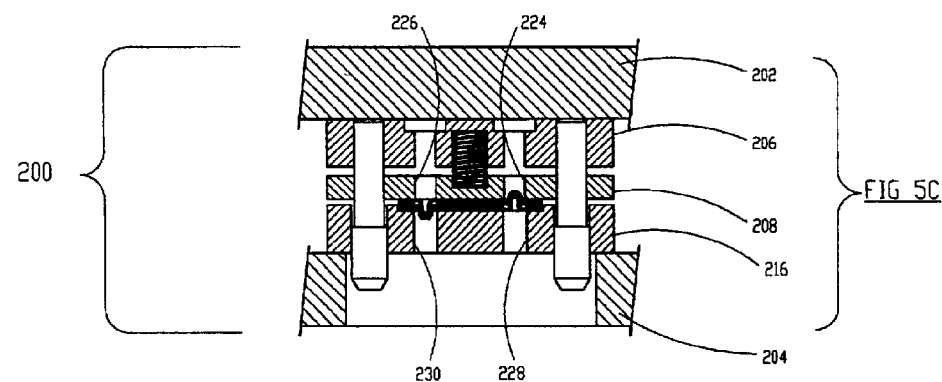
FIG. 5C is the view of FIG. 5B showing the top tool base and lower tool base in full engagement.
Figure 5D:
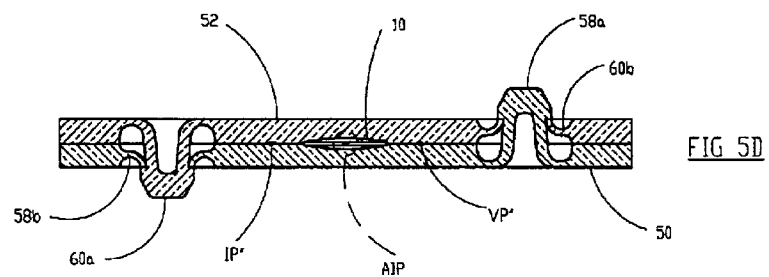
FIG. 5D is a cross-sectional, side elevational view of the mold halves of the third and fourth embodiments of the invention shown in the fully assembled position.
Figure 6A:
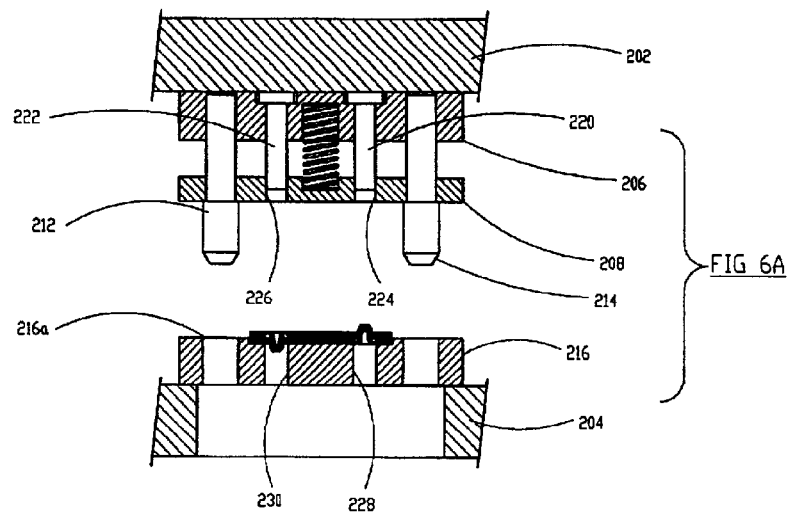
FIG. 6A is the view of FIG. 5A showing the top tool base in the raised position and the mold assembly, post-curing of the IOL therein, seated on the lower mold base.
Figure 6B:
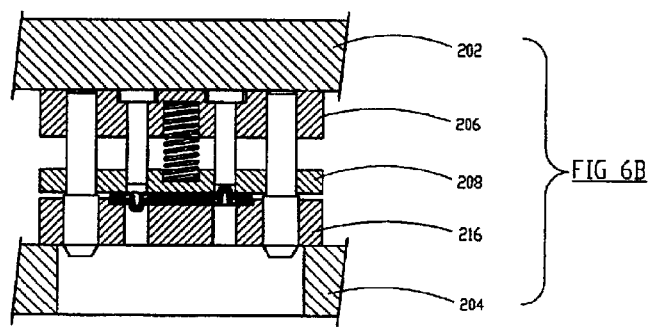
FIG. 6B is the view of FIG. 6A showing the top tool base in the lowered position immediately prior to shearing the mold halves apart.
Figure 6C:
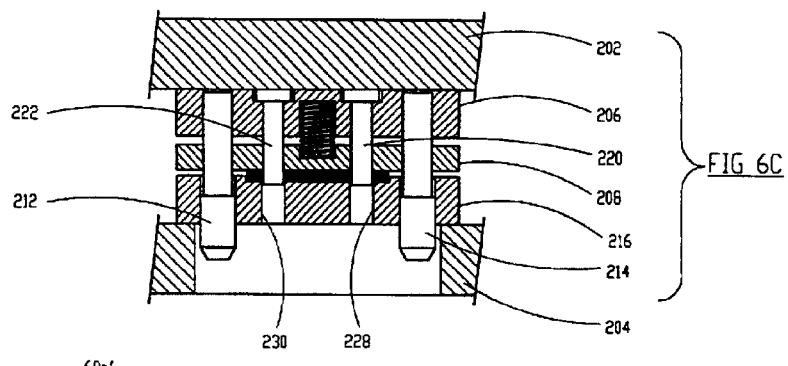
FIG. 6C is the view of FIG. 6B showing the top tool base in the fully engaged position for shearing the mold halves.

A clamping tool 200 seen in FIGS. 5A–5C may be used to clamp the mold halves together. Tool 200 is seen to include an upper base 202 and lower base 204 which are movable between the raised position seen in FIG. 5A, and the closed, clamped position seen in FIG. 5C. Upper base 202 includes first and second clamp plates 206, 208, respectively, which are biased by spring 210 in the spaced position seen in FIG. 6A. A pair of alignment pins 212 and 214 are fixed to upper base 202 and extend through holes in first clamp plate 206 and then through holes in second clamp plate 208. The holes in second clamp plate 208 through which the alignment pins 212, 214 extend are large enough such that pins 212 and 214 may slide back and forth therethrough.

Lower base 204 includes a clamp plate 216 having a top surface 216a upon which the assembled, but as yet unclamped, mold halves 50, 52 sit. It is noted that mold halves 50, 52 are being used for the purpose of description only and that other embodiments of the invention may also be clamped using tool 200. With mold halves 50,52 being placed upon top surface 216a, upper tool base 202 is lowered with alignment pins 212, 214 extending through holes 218, 220, respectively, formed in lower tool clamp plate 216 as seen in FIG. 5B. In this position, second clamp plate 208 of the upper tool base 202 is in contacting, covering relation to lower clamp plate 216. Upper clamp base 202 is then further lowered which compresses spring 210 and causes first clamp plate 206 to come into engagement with second clamp plate 208. The resultant force against second clamp plate 216 and also now lower clamp plate 216 presses mold halves 50,52 together until the bosses 60a, 58a snap-fit through respective apertures 58b,60b thereof. Once so assembled, the top tool base 202 is raised and the assembled mold halves 50,52 as seen in FIG. 5D, is retrieved for injecting of the IOL mold material therein through the injection port IP" or alternate injection port AIP as described above.

Figure 6D:
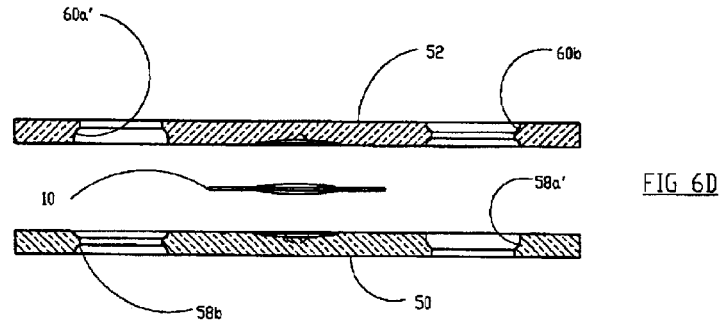
FIG. 6D is a cross-sectional, side elevational view of the sheared apart mold halves in spaced relation and the molded IOL released therefrom.

Once the mold cavity has been filled, the mold material is cured (e.g., by thermal and/or UV means), whereupon the mold halves are separated which may be accomplished using the same tool 200 which has been fit with a pair of shearing pins 220, 222 as seen in FIGS. 6A–6D. More particularly, shearing pins 220, 222 are fixed to upper base 202 and extend through holes formed in first and second clamping plates 206, 208, respectively. The holes in the second clamping plate 208 through which the shearing pins extend are large enough to allow the shearing pins to move back and forth therethrough. Thus, following curing of the mold material within the mold, the still clamped mold assembly 50, 52 is placed upon upper surface 216a of lower clamp plate 216 with each boss/aperture fitting 58a, 60b and 60a, 58b positioned directly over respective holes 228 and 230 formed in lower clamp plate 216 (see FIG. 6A). The shearing pins 220 and 22 are also aligned with holes 228 and 230, respectively, such that as upper base 202 is completely lowered to the position seen in FIG. 6C, shearing pins 220 and 222 push through boss/aperture fittings 58a, 60b and 60a, 58b and extend into holes 228, 230 of lower clamp plate 216. In the process, the boss/aperture fittings are sheared away leaving holes 60a', 58b' and 60b', 58a' as seen in FIG. 6D whereupon the mold halves 50 and 52 may be separated from each other and the IOL 10 molded therein retrieved for further processing as required (e.g., polishing, sterilization, packaging, etc.).

Although the present invention has been described with reference to an open-loop IOL 10 and closed-looped IOL 18 as shown herein, it is understood that the present invention is applicable to other IOL designs having one or more haptics which may be of any desired configuration. It will thus be appreciated that the configuration of the mold cavity defined by the facing surfaces of the mold halves may vary depending on the IOL design being manufactured.

What is claimed is:

1. A method for molding a single-piece IOL having an optic and first and second haptics connected to said optic, said method comprising the steps of:

providing a mold having first and second mold halves, each of said mold halves having an optic forming surface and first and second haptic forming surfaces, the optic forming surfaces and the first and second haptic forming surfaces together forming a mold cavity in a shape of said IOL when said mold halves are assembled together, said first and second haptic forming surfaces each connected to said optic forming surface, said haptic forming surfaces of the mold halves further defining looped haptics when the mold halves are assembled together;

providing an injection port connected to said first haptic forming surfaces when said mold halves are assembled together;

providing a venting port connected to said second haptic forming surfaces when said mold halves are assembled together;

assembling said first and second mold halves together while aligning said optic forming surfaces and said first and second haptic forming surfaces on each of said first and second mold halves, respectively, and thereby forming said mold cavity;

injecting a quantity of polymerizable material through said injection port into said mold cavity with air simultaneously escaping from said mold cavity through said venting port;

curing said polymerizable material to form said IOL; and separating said mold halves and releasing said IOL therefrom.

2. The method of claim 1, further comprising the step of providing an alternate injection port connected to said optic forming surface when said mold halves are assembled together.

3. The method of claim 1 wherein said mold halves are substantially cylindrically shaped.

4. The method of claim 1 wherein said mold halves are substantially rectangularly shaped.

5. The method of claim 1 wherein said mold halves include means for aligning said optic forming surfaces and said haptic forming surfaces on said first and second mold halves, respectively, as said mold halves are being assembled together.

6. The method of claim 1 wherein said IOL is an open-looped IOL having first and second haptics each having an end attached to said optic and an opposite, free end, and wherein said first and second mold halves have first and second haptic forming surfaces each having an attached end and an opposite free end, and wherein said injection port is connected to said free end of said first haptic forming surface and said venting port is connected to said free end of said second haptic forming surface when said mold halves are assembled together.

7. The method claim 1 wherein said IOL is a dosed-looped IOL having first and second haptics each having first and second ends attached to said optic, and wherein said first and second mold halves each have first and second haptic forming surfaces, and wherein said injection port is connected to said first haptic forming surface and said venting port is connected to said second haptic forming surface when said mold halves are assembled together.

8. A method for molding an IOL having an optic and first and second open-looped haptics, said haptics each having an end connected to said optic and an opposite free end, said method comprising the steps of:

providing a mold having first and second mold halves, each of said mold halves having an optic forming surface and first and second haptic forming surfaces, the optic forming surfaces and the haptic forming surfaces together forming a mold cavity in a shape of said IOL when said mold halves are assembled together, said first and second haptic forming surfaces each having an end connected to said optic and an opposite, free end, and said first and second haptic forming surfaces defining said open-looped haptics;

providing an injection port connected to said free ends of said first haptic forming surfaces when said mold halves are assembled together;

providing a venting port connected to said free ends of said second haptic forming surfaces when said mold halves are assembled together;

assembling said first and second mold halves together while aligning said optic forming surfaces and said first and second haptic forming surfaces on each of said first and second mold halves, respectively, and thereby forming said mold cavity;

injecting a quantity of polymerizable material through said injection port into said mold cavity with air simultaneously escaping from said mold cavity through said venting port;

curing said polymerizable material to form said IOL; and separating said mold halves and releasing said IOL therefrom.

9. A method for molding a single-piece IOL having an optic and first and second closed-looped haptics, said haptics each having first and second ends and a loop portion extending therebetween, said method comprising the steps of:

providing a mold having first and second mold halves, each of said mold halves having an optic forming surface and first and second haptic forming surfaces, all of which surfaces form a mold cavity in a shape of said IOL when said mold halves are assembled together, said first end second ends of said haptic forming surfaces connected to said optic forming surface, and said first and second haptic forming surfaces defining said closed-looped haptics;

providing an injection part connected to said first haptic forming surfaces when said mold halves are assembled together;

providing a venting port extending from said second haptic forming surfaces when said mold halves are assembled together;

assembling said first and second mold halves together while aligning said optic forming surfaces and haptic forming surfaces on each of said first and second mold halves and thereby forming said mold cavity;

injecting a quantity of polymerizable material through said injection port into said mold cavity with air simultaneously escaping through said venting port;

curing said polymerizable material to form said IOL; and separating said mold halves and releasing said IOL therefrom.

10. A method for molding a single-piece IOL having an optic and first and second haptics connected to said optic, said method comprising the steps of:

providing a mold having first and second mold halves, each of said mold halves having an optic forming surface and first and second haptic forming surfaces, the optic forming surfaces and the first and second haptic forming surfaces together forming a mold cavity in a shape of said IOL when said mold halves are assembled together, said first and second haptic forming surfaces each connected to said optic forming surface, said haptic forming surfaces of the mold halves further defining looped haptics when the mold halves are assembled together;

providing an injection port connected to said optic forming surfaces when said mold halves are assembled together;

providing a venting port connected to at least one of said first and second haptic forming surfaces when said mold halves are assembled together;

assembling said first and second mold halves together while aligning said optic forming surfaces and said first and second haptic forming surfaces on each of said first and second mold halves, respectively, and thereby forming said mold cavity;

injecting a quantity of polymerizable material through said injection port into said mold cavity with air simultaneously escaping from said mold cavity through said venting port;

curing said polymerizable material to form said IOL; and separating said mold halves and releasing said IOL therefrom.

11. A method for molding a single-piece IOL having an optic and at least one haptic connected to said optic, said method comprising the steps of:

providing a mold having first and second mold halves, each of said mold halves having an optic farming surface and at least one haptic forming surface, the optic forming surfaces and the haptic forming surface together forming a mold cavity in a shape of said IOL when said mold halves are assembled together, said first and second haptic forming surfaces each connected to said optic forming surface, said haptic forming surfaces of the mold halves further defining a looped haptic when the mold halves are assembled together which form a mold cavity in the shape of said IOL when said mold halves are assembled together, said at least one haptic forming surface connected to said optic forming surface;

providing an injection port connected to said optic forming surfaces when said mold halves are assembled together;

providing a venting port connected to said at least one haptic forming surfaces when said mold halves are assembled together;

assembling said first and second mold halves together while aligning said optic forming surfaces and said at least one haptic forming surface on each of said first and second mold halves, respectively, and thereby forming said mold cavity;

injecting a quantity of polymerizable material through said injection port into said mold cavity with air simultaneously escaping from said mold cavity through said venting port;

curing said polymerizable material to form said IOL; and separating said mold halves and releasing said IOL therefrom.

12. The method of claim 1, and further comprising the step of providing a damping tool for assembling said mold halves together.

13. The method of claim 12 wherein said mold halves each include means for aligning said optic forming surfaces and said haptic forming surfaces on said first and second mold halves as said mold halves are being assembled.

14. The method of claim 13 wherein said alignment means are operable to clamp said mold halves together.

15. The method of claim 14 wherein said clamping tool includes means for releasing the clamped mold halves such that said first and second mold halves may be separated from each other.

16. The method of claim 15 wherein said alignment means comprise a boss and recess fitting on said first and second mold halves, respectively.

17. The method of claim 16 wherein said damp releasing means on said damping tool comprises a shearing pin.

18. The method of claim 1, and further comprising the step of providing at least two different polymerizable materials for sequential injection through said injection port whereby said IOL is comprised of said at least two different polymerizable materials.

19. The method of claim 18, whereby said at leant two polymerizable materials comprise a hydrogel and PMMA.

20. An apparatus for molding a single-piece IOL having an optic and first and second haptics connected to said optic, said apparatus comprising:

a mold having first and second mold halves, each of said mold halves having an optic forming surface and first and second haptic forming surfaces, the optic forming surfaces and the first and second haptic forming surfaces together forming a mold cavity in a shape of said IOL when said mold halves are assembled together, said first and second haptic forming surfaces each connected to said optic forming surface, said haptic forming surfaces of the mold halves further defining looped haptics when the mold halves are assembled together;

an injection port connected to said first haptic forming surfaces when said mold halves are assembled together;

a venting port connected to said second haptic forming surfaces when said mold halves are assembled together;

said first and second mold halves adapted to be assembled together with said optic forming surfaces and said first and second haptic forming surfaces on each of said first and second mold halves in alignment, respectively, and thereby forming said mold cavity;

said injection port adapted to receive a quantity of polymerizable material therethrough and into said mold cavity with air being allowed to escape from said mold cavity through said venting port;

said polymerizable material being cured to form said IOL whereupon said mold halves are separated to retrieve said IOL therefrom.

* * * * *

UNITED STATES PATENT AND TRADEMARK OFFICE
CERTIFICATE OF CORRECTION

PATENT NO.       : 6,939,486 B2                                          Page 1 of 1
APPLICATION NO.  : 10/180797
DATED            : September 6, 2005
INVENTOR(S)      : Kevin J. DeRyke, et al.

It is certified that error appears in the above-identified patent and that said Letters Patent is hereby corrected as shown below:

Col. 8, line 63
  replace "dosed-looped"
  with --closed-looped--.

Col. 11, line 4
  replace "damping"
  with --clamping--.

Col. 11, line 26
  replace "leant"
  with --least--.

Signed and Sealed this

Twenty-fifth Day of December, 2007

JON W. DUDAS
*Director of the United States Patent and Trademark Office*